United States Patent
Namose et al.

(10) Patent No.: US 12,518,565 B2
(45) Date of Patent: Jan. 6, 2026

(54) INFORMATION PROCESSING DEVICE

(71) Applicant: OMRON Corporation, Kyoto (JP)

(72) Inventors: Isamu Namose, Kyoto (JP); Tsubasa Fujiki, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 421 days.

(21) Appl. No.: 18/089,306

(22) Filed: Dec. 27, 2022

(65) Prior Publication Data
US 2023/0237843 A1    Jul. 27, 2023

(30) Foreign Application Priority Data
Jan. 21, 2022  (JP) ................. 2022-007876

(51) Int. Cl.
*G06T 7/70*    (2017.01)
*G06V 40/16*   (2022.01)

(52) U.S. Cl.
CPC ........... *G06V 40/176* (2022.01); *G06T 7/70* (2017.01)

(58) Field of Classification Search
CPC .... G06V 40/176; G06V 40/174; G06V 40/20; G06T 7/70
See application file for complete search history.

(56) References Cited

U.S. PATENT DOCUMENTS 10,565,439 B2 *  2/2020  Wang ................ G06V 40/10
2009/0268944 A1  10/2009  Matsuoka et al.
2017/0311863 A1  11/2017  Matsunaga
2019/0043216 A1 *  2/2019  Yabuuchi ............... G06V 10/82
2019/0239795 A1 *  8/2019  Kotake ................ A61B 5/7267
2019/0340780 A1  11/2019  Hiraide et al.
2021/0096726 A1 *  4/2021  Faulkner ................ G06F 3/017
2021/0287155 A1 *  9/2021  Kotake ................ A61B 5/0531
2021/0295053 A1  9/2021  Ohashi et al.

(Continued)

FOREIGN PATENT DOCUMENTS

JP    2006-119408 A    5/2006
JP    2009-266086 A    11/2009

(Continued)

OTHER PUBLICATIONS

Extended European Search Report dated Jun. 6, 2023 in Application No. 22215913.9.

(Continued)

*Primary Examiner* — Shaghayegh Azima
(74) *Attorney, Agent, or Firm* — Sughrue Mion, PLLC (57) ABSTRACT

An information processing device includes a camera interface and a processor, the camera interface acquiring a moving image from a first camera that is installed at a production site and that images a worker and surroundings of the worker and from a second camera that is installed at the production site and that images a face of the worker. The processor detects an operation section of work performed by the worker from a predetermined number of consecutive frames included in the moving image acquired from the first camera using an inference model. The processor detects the emotion and the line-of-sight direction of the worker included in each frame of the moving image acquired from the second camera. Further, the processor provides a detection result.

12 Claims, 10 Drawing Sheets

(56) References Cited

U.S. PATENT DOCUMENTS

| | | | | |
|---|---|---|---|---|
| 2022/0157341 A1* | 5/2022 | Adato | .................... | G06T 11/40 |
| 2022/0230440 A1 | 7/2022 | Fujimoto | | |
| 2023/0206691 A1 | 6/2023 | Tsuji et al. | | |
| 2023/0360437 A1 | 11/2023 | Shin et al. | | |
| 2024/0005619 A1* | 1/2024 | Yoshizawa | .............. | G06T 19/20 |

FOREIGN PATENT DOCUMENTS

| | | | |
|---|---|---|---|
| JP | 2016-149063 A | 8/2016 | |
| JP | 2018-142258 A | 9/2018 | |
| JP | 2019-197373 A | 11/2019 | |
| JP | 2020-146345 A | 9/2020 | |
| JP | 2020-184225 A | 11/2020 | |
| JP | 2020-204819 A | 12/2020 | |
| JP | 2021-56808 A | 4/2021 | |
| JP | 2021-64280 A | 4/2021 | |
| JP | 2021-82249 A | 5/2021 | |
| JP | 2021-149446 A | 9/2021 | |
| JP | 2022-6253 A | 1/2022 | |
| TW | 201810128 A | 3/2018 | |
| TW | 201915814 A | 4/2019 | |
| WO | WO-2021192398 A1 * | 9/2021 | ............. G08B 25/04 |

OTHER PUBLICATIONS

Taiwanese Office Action dated Sep. 28, 2023 in Application No. 111149873.

Communication dated Jun. 19, 2025 in Korean Application No. 10-2022-0179132.

Communication dated Jul. 16, 2025 in Chinese Application No. 202211630301.3.

Communication dated Aug. 26, 2025 in Japanese Application No. 2022-007876.

* cited by examiner

INFORMATION PROCESSING DEVICE

BACKGROUND OF THE INVENTION

Field of the Invention

The present disclosure relates to an information processing device and an information processing method.

Description of the Background Art

Conventionally, there has been an attempt to improve work processes included in a work site such as a factory by using a moving image captured by a camera installed in the work site. For example, Japanese Patent Laying-Open No. 2020-204819 discloses an information processing device that analyzes a moving image obtained by image capture with a ceiling camera. The information processing device analyzes the moving image to determine whether or not there is a worker in a monitoring area associated with each process, and generates data indicating a time zone determined to have a worker in the monitoring area.

SUMMARY OF THE INVENTION

In the technique disclosed in Japanese Patent Laying-Open No. 2020-204819, whether or not there is a worker in a monitoring area associated with each process is monitored, but a detailed situation of the worker cannot be monitored.

The present disclosure has been made in view of the above problems, and an object thereof is to provide an information processing device and an information processing method with which it is possible to recognize a detailed situation of a worker.

According to an example of the present disclosure, an information processing device includes an acquisition unit, an operation section detector, and a provision unit. The acquisition unit acquires a moving image from a camera that is installed at a production site and that images a target worker and surroundings of the target worker. The operation section detector detects, from a predetermined number of consecutive first frames included in the moving image, an operation section of work performed by the target worker included in the predetermined number of first frames using an inference model. The provision unit provides a detection result by the operation section detector. The inference model is generated by learning processing using a plurality of learning data sets. Each of the plurality of learning data sets includes a predetermined number of consecutive second frames included in a moving image that includes a specific worker, and a label indicating an operation section of work performed by the specific worker included in the predetermined number of second frames.

According to an example of the present disclosure, an information processing device includes: an acquisition unit configured to acquire a moving image from a camera that images a face of a worker, the camera being installed at a production site; an emotion detector configured to detect an emotion of the worker included in each frame of the moving image; and a provision unit configured to provide a transition of the emotion detected by the emotion detector.

In the above disclosure, the emotion detector preferably outputs a score of each of a plurality of types of emotions. Furthermore, the provision unit preferably provides a notification for promoting care for the worker in response to the score of a target type out of the plurality of types of emotions falling outside a prescribed range.

According to one example of the present disclosure, an information processing device includes: an acquisition unit configured to acquire a moving image from a camera that images a face of a worker, the camera being installed at a production site; a line-of-sight detector configured to detect a line-of-sight direction of the worker included in each frame of the moving image; and a provision unit configured to provide an image including an object in front of the worker. The provision unit determines a position of a viewpoint of the worker in the image on the basis of the line-of-sight direction detected by the line-of-sight detector, and displays a mark at the determined position in the image.

According to one example of the present disclosure, an information processing method includes: acquiring a moving image from a camera that is installed at a production site and that images a target worker and surroundings of the target worker; detecting, from a predetermined number of consecutive first frames included in the moving image, an operation section of work performed by the target worker included in the predetermined number of first frames using an inference model; and providing a detection result. The inference model is generated by learning processing using a plurality of learning data sets, and each of the plurality of learning data sets includes a predetermined number of consecutive second frames included in a moving image that includes a specific worker, and a label indicating an operation section of work performed by the specific worker included in the predetermined number of second frames.

According to one example of the present disclosure, an information processing method includes: acquiring a moving image from a camera that is installed at a production site and that images a face of a worker; detecting an emotion of the worker included in each frame of the moving image; and providing a transition of the emotion detected.

In the above disclosure, the detecting preferably includes outputting a score of each of a plurality of types of emotions. The providing preferably includes providing a notification for promoting care for the worker in response to a score of a target type out of the plurality of types falling outside a prescribed range.

According to one example of the present disclosure, an information processing method includes: acquiring a moving image from a camera that is installed at a production site and that images a face of a worker; detecting a line-of-sight direction of the worker included in each frame of the moving image; and providing an image including an object in front of the worker. The providing includes determining a position of a viewpoint of the worker in the image on the basis of the line-of-sight direction that has been detected, and displaying a mark at the determined position in the image.

According to these disclosures, a user can recognize a detailed situation (operation section of work, line-of-sight direction, and emotion) of the worker.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram illustrating three frames respectively corresponding to three operation sections corresponding to a "soldering" process, and a frame not belonging to any operation section, in which FIG. 5(a) illustrates a frame of a first section, FIG. 5(b) illustrates a frame of a second section, FIG. 5(c) illustrates a frame of a third section, and FIG. 5(d) illustrates a frame not belonging to any of the first to third sections.

DESCRIPTION OF THE PREFERRED EMBODIMENTS

An embodiment of the present invention will be described in detail with reference to the drawings. The same or corresponding parts in the drawings are denoted by the same reference signs, and the description thereof will not be repeated. Modifications described below may be appropriately and selectively combined.

Figure 1:
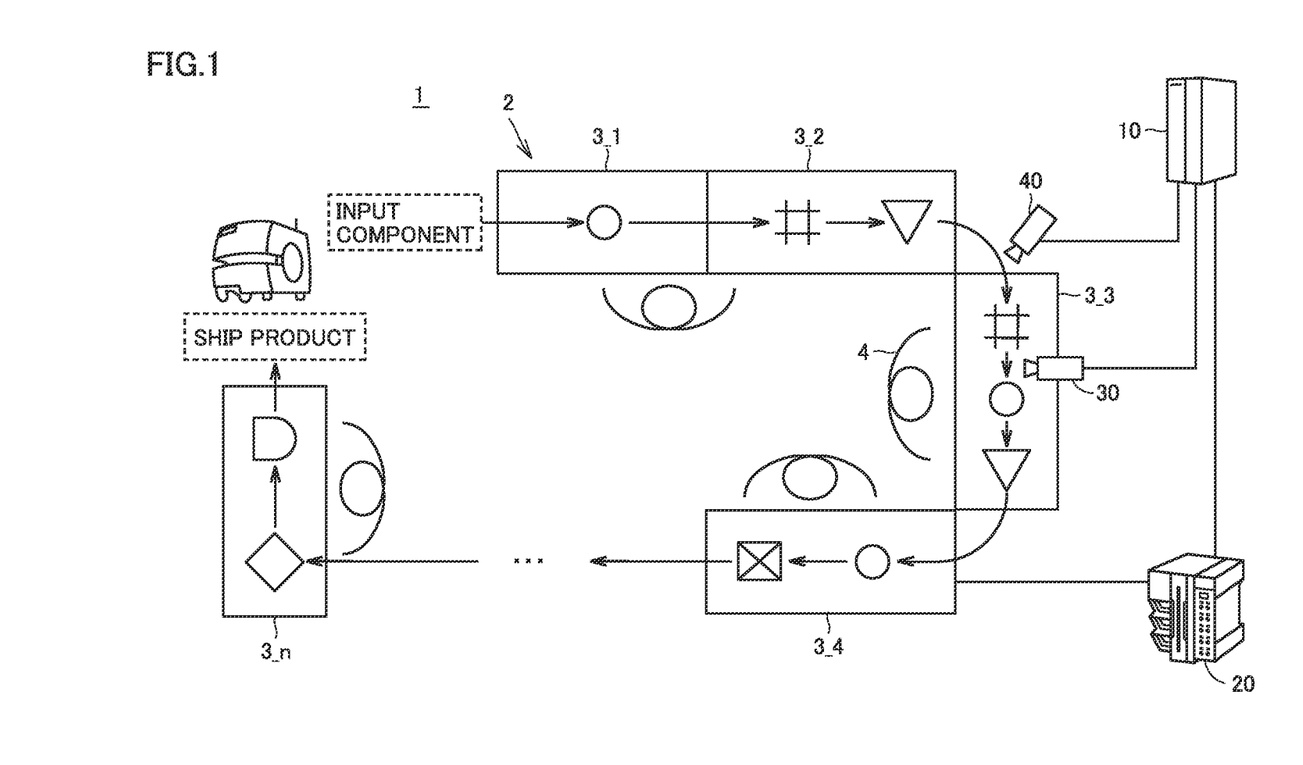
FIG. 1 is a diagram illustrating an overall configuration of a system to which an information processing device according to an embodiment is applied.

FIG. 1 is a diagram illustrating an overall configuration of a system to which an information processing device according to the present embodiment is applied. As illustrated in FIG. 1, a system 1 includes a production line 2, an information processing device 10, a programmable logic controller (PLC) 20, and cameras 30 and 40.

Production line 2 includes multiple processes 3_1 to 3_n and produces various products. Multiple processes 3_1 to 3_n include, for example, a "soldering" process, a "board assembly" process, a process of "incorporating board into body", an "inspection" process, and the like. Various devices can be installed in each process of the production line 2. Examples of the devices include a robot, a machining device, an inspection device, various sensors, and the like.

PLC 20 is a controller that controls entire production line 2, and is communicably connected to devices installed in production line 2. Various types of industrial Ethernet (registered trademark) are used as a network that communicably connects PLC 20 and the devices. As the industrial Ethernet (registered trademark), EtherCAT (registered trademark), Profinet IRT, MECHATROLINK (registered trademark)-III, Powerlink, SERCOS (registered trademark)-III, CIP Motion, and the like are known for example, and any of these protocols may be adopted. Further, a field network other than Industrial Ethernet (registered trademark) may be used. For example, in a case where motion control is not performed, DeviceNet, CompoNet/IP (registered trademark), or the like may be used.

PLC 20 operates as a master in a master-slave control system, and acquires information from the devices as input data. PLC 20 executes arithmetic processing using the acquired input data in accordance with a user program incorporated in advance. PLC 20 determines a control content for the master-slave control system in response to the execution of the arithmetic processing, and outputs control data corresponding to the control content to the devices. PLC 20 repeatedly acquires input data from the devices and outputs control data to the devices at a predetermined cycle (control cycle).

Cameras 30 and 40 are installed so as to capture an image of a worker who works in production line 2. In the example shown in FIG. 1, cameras 30 and 40 are installed so as to capture an image of a worker 4 in process 3-3. Specifically, camera 30 is installed at a position where the face of worker 4 can be imaged from the front. Camera 40 is installed at a position where worker 4 and a work table of process 3-3 can be imaged. Cameras 30 and 40 output moving image data (hereinafter simply referred to as a "moving image") obtained by image capture to information processing device 10. Note that cameras 30 and 40 may be installed not only in process 3-3 but also in a process other than process 3-3.

Information processing device 10 is, for example, a general-purpose computer, and analyzes a detailed situation of worker 4 working in process 3-3 on the basis of the moving images acquired from cameras 30 and 40. Note that information processing device 10 may use the input data acquired by PLC 20 and the control data output from PLC 20 when analyzing the situation of worker 4.

<Hardware Configuration of Information Processing Device>

Figure 2:
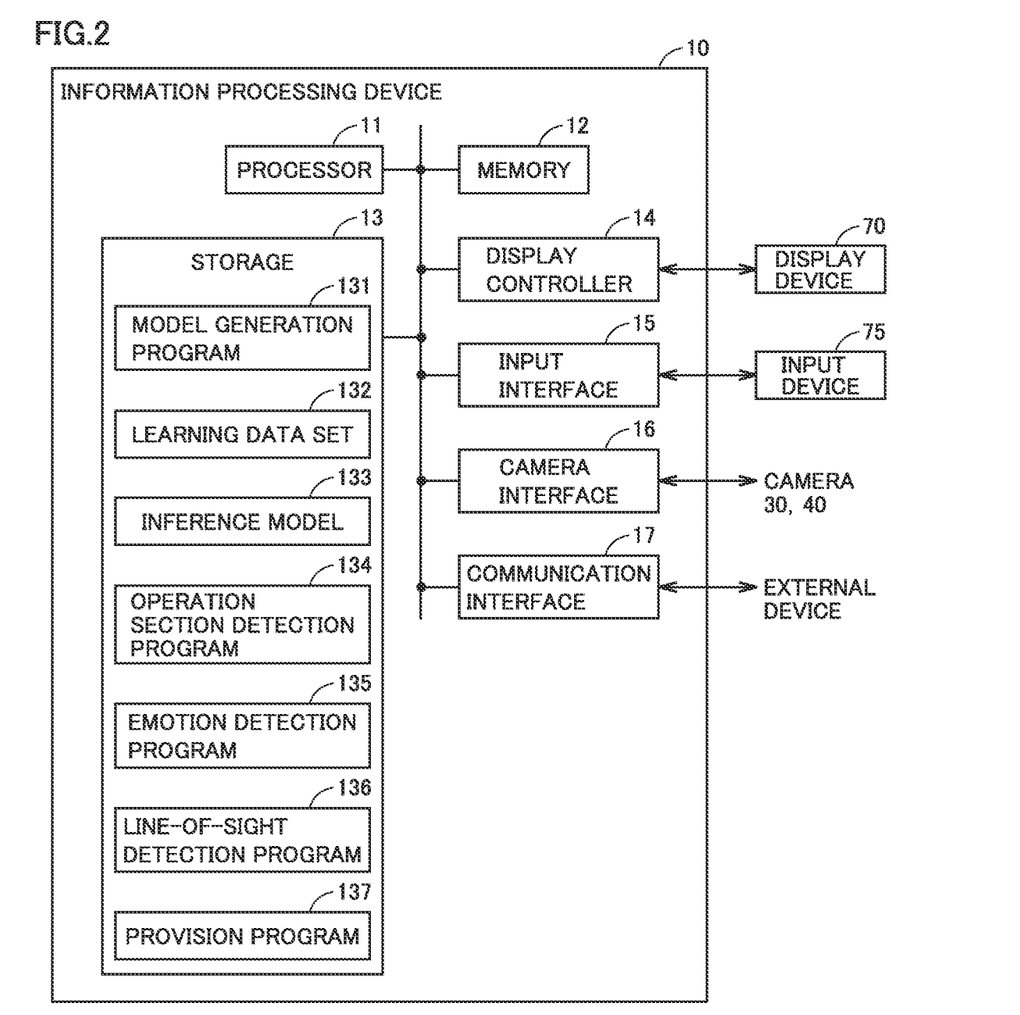
FIG. 2 is a schematic diagram illustrating a hardware configuration example of the information processing device according to the embodiment.

FIG. 2 is a schematic diagram illustrating a hardware configuration example of the information processing device according to the embodiment. Information processing device 10 typically has a structure according to a general-purpose computer architecture as illustrated in FIG. 2. Specifically, information processing device 10 includes a processor 11 such as a central processing unit (CPU) or a micro-processing unit (MPU), a memory 12, a storage 13, a display controller 14, an input interface 15, a camera interface 16, and a communication interface 17. These components are connected to each other via a bus so as to be able to perform data communication.

Processor 11 implements various kinds of processing according to the present embodiment by expanding various programs stored in storage 13 in memory 12 and executing the programs.

Memory 12 is typically a volatile storage device such as a DRAM, and stores a program read from storage 13 and the like.

Storage 13 is typically a non-volatile magnetic storage device such as a hard disk drive. Storage 13 stores a model generation program 131, an operation section detection program 134, an emotion detection program 135, a line-of-sight detection program 136, and a provision program 137 which are to be executed by processor 11. Storage 13 also stores a plurality of learning data sets 132 used for execution of model generation program 131 and an inference model 133 generated by execution of model generation program 131. Various programs installed in storage 13 are distributed in a state of being stored in a memory card or the like.

Display controller 14 is connected to display device 70, and outputs a signal for displaying various types of information to display device 70 in accordance with an internal command from processor 11.

Input interface 15 mediates data transmission between processor 11 and an input device 75 such as a keyboard, a mouse, a touch panel, or a dedicated console. That is, input interface 15 receives an operation command given by a user operating input device 75.

Camera interface 16 mediates data transmission between processor 11 and cameras 30 and 40. More specifically, an imaging instruction is output from processor 11 to cameras 30 and 40 via camera interface 16. Camera interface 16 outputs the moving image received from cameras 30 and 40 to processor 11 in response to the imaging instruction. Camera interface 16 operates as an acquisition unit that acquires a moving image from cameras 30 and 40.

Communication interface 17 mediates data transmission between processor 11 and an external device (for example, PLC 20). Communication interface 17 typically includes Ethernet (registered trademark), a universal serial bus (USB), and the like. Note that various programs stored in storage 13 may be downloaded from a distribution server or the like via communication interface 17.

When a computer having a structure following the general-purpose computer architecture as described above is used, an operating system (OS) for providing basic functions of the computer may be installed in addition to an application for providing the functions according to the present embodiment. In this case, the program according to the present embodiment may execute processing by calling necessary modules in a predetermined order and timing among program modules provided as a part of the OS. That is, the program itself according to the present embodiment does not include the module as described above, and processing may be executed in cooperation with the OS.

Alternatively, some or all of the functions provided by executing model generation program 131, operation section detection program 134, emotion detection program 135, line-of-sight detection program 136, and provision program 137 may be implemented as a dedicated hardware circuit.

<Functional Configuration of Information Processing Device>

Figure 3:
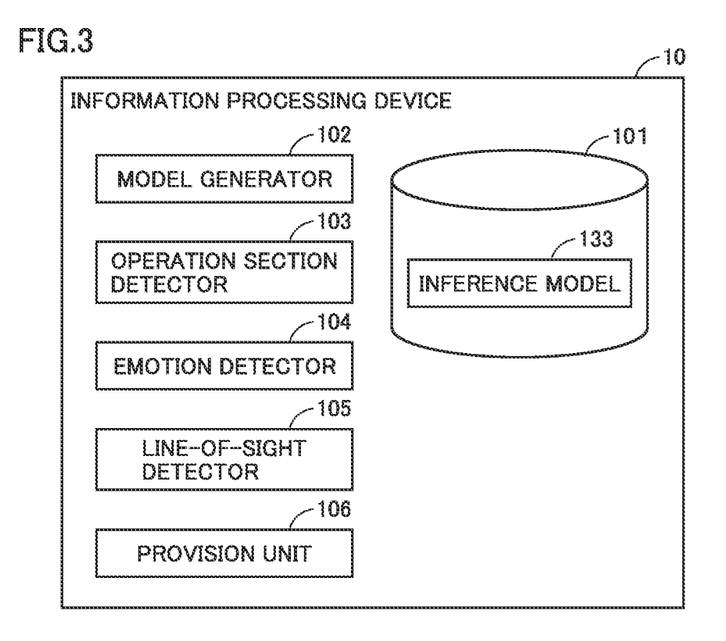
FIG. 3 is a diagram illustrating an example of functional configuration of the information processing device according to the embodiment.

FIG. 3 is a diagram illustrating an example of functional configuration of the information processing device according to the embodiment. As illustrated in FIG. 3, information processing device 10 includes a storage unit 101, a model generator 102, an operation section detector 103, an emotion detector 104, a line-of-sight detector 105, and a provision unit 106. Storage unit 101 is implemented by memory 12 and storage 13. Model generator 102 is implemented by processor 11 executing model generation program 131. Operation section detector 103 is implemented by processor 11 executing operation section detection program 134. Emotion detector 104 is implemented by processor 11 executing emotion detection program 135. Line-of-sight detector 105 is implemented by processor 11 executing line-of-sight detection program 136. Provision unit 106 is implemented by display controller 14, input interface 15, and processor 11 that executes provision program 137.

(Configuration Related to Function of Detecting Operation Section)

The work of each process includes multiple operation sections. For example, the "soldering" process includes an operation section in which the board is carried in from a previous process and is attached to a jig, an operation section in which a component is soldered to the board, and an operation section in which the board is taken out from the jig and transferred to the next process.

Model generator 102 generates inference model 133 that infers the operation section to which each frame of the moving image obtained by image capture with camera 40 belongs. Model generator 102 stores generated inference model 133 in storage unit 101.

Inference model 133 may be appropriately configured to be capable of executing arithmetic processing of carrying out an inference task corresponding to the target data by, for example, a predetermined algorithm, a predetermined rule, a functional expression, or the like. The output of inference model 133 may be appropriately configured to be able to specify a result of the execution of the inference task. In an example of the present embodiment, inference model 133 includes a trained machine learning model generated by machine learning. The machine learning model includes parameters that can be adjusted by machine learning. The configuration and type of the machine learning model may be appropriately selected according to the embodiment.

Figure 4:
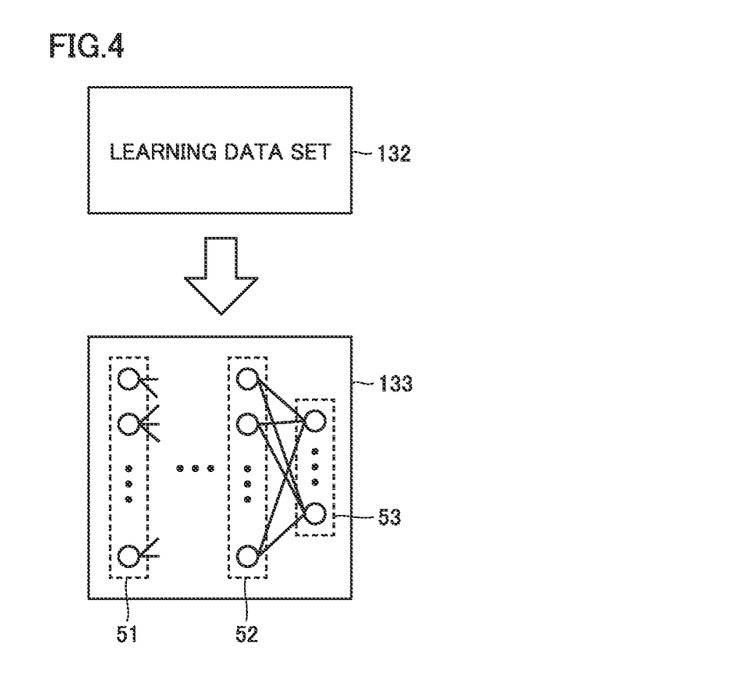
FIG. 4 is a diagram illustrating an example of an inference model.

FIG. 4 is a diagram illustrating an example of the inference model. FIG. 4 illustrates inference model 133 configured by a neural network.

As illustrated in FIG. 4, inference model 133 includes an input layer 51, one or more intermediate (hidden) layers 52, and an output layer 53. The number of intermediate layers 52 may be appropriately determined according to the embodiment. Intermediate layer 52 may be omitted. The number of layers of the neural network constituting inference model 133 may be appropriately determined according to the embodiment. Input layer 51 may be appropriately configured to be able to receive target data. Output layer 53 may be appropriately configured to output a value corresponding to the inference result. Input layer 51 may be configured to be able to receive information other than the target data, and output layer 53 may be configured to output information other than the information corresponding to the inference result.

Each of input layer 51, intermediate layer 52, and output layer 53 includes one or more nodes (neurons). The number of nodes included in each of input layer 51, intermediate layer 52, and output layer 53 is not particularly limited, and may be appropriately determined according to the embodiment. The node included in each of input layer 51, intermediate layer 52, and output layer 53 may be connected to all nodes in adjacent layers. As a result, inference model 133 may be constructed with a fully connected neural network. However, the connection relationship of the nodes is not limited to such an example, and may be appropriately determined according to the embodiment. For example, each node may be connected to a specific node of an adjacent layer or may be connected to a node of a layer other than the adjacent layer.

A weight (connection weight) is set to each connection between the nodes. A threshold is set for each node, and basically, an output of each node is determined according to whether or not a sum of products of each input and each weight exceeds the threshold. The threshold may be expressed by an activating function. In this case, the sum of the products of each input and each weight is input to the activating function, and the operation of the activating function is executed, so that the output of each node is determined. The type of the activating function may be freely selected. The weight of each connection between nodes included in input layer 51, intermediate layer 52, and output layer 53 and the threshold of each node are examples of parameters used for the arithmetic processing of inference model 133.

In machine learning, the values of the parameters of inference model 133 are adjusted, as appropriate, to obtain the ability to perform a desired inference task using the plurality of learning data sets 132. Learning data set 132 includes a combination of training data and a correct label. In one example, the machine learning is configured by training inference model 133 so that the execution result of the inference task obtained from inference model 133 through an input of the training data to inference model 133 for learning data set 132 matches the corresponding correct label (adjusting the value of the parameter). For example, a known method such as an error back-propagation method may be adopted as the machine learning method according to the machine learning model.

In the present embodiment, learning data set 132 is created in advance from a moving image obtained by image capture with camera 40. The moving image includes a specific worker selected for machine learning. Each of the plurality of learning data sets 132 includes training data that is a predetermined number of consecutive frames included in the moving image, and a correct label indicating an operation section of the work performed by the specific worker included in the training data. As a result, by inputting a predetermined number of frames, inference model 133 in which a label indicating an operation section to be inferred is output is generated.

Operation section detector 103 detects an operation section to which each frame of the moving image obtained from camera 40 belongs. Specifically, operation section detector 103 inputs a predetermined number of consecutive frames including a frame (hereinafter referred to as "target frame") from which an operation section is to be detected to inference model 133. For example, a predetermined number (m+n+1) of frames including m consecutive frames before the target frame, the target frame, and n consecutive frames after the target frame are input to inference model 133. Operation section detector 103 detects the operation section indicated by the label output from inference model 133 as the operation section to which the target frame belongs.

(Emotion Detector)

Emotion detector 104 detects the emotion of the worker on the basis of the moving image acquired from camera 30. Emotion detector 104 may detect emotion using a known technology (for example, Japanese Patent Laying-Open No. 2016-149063).

For example, emotion detector 104 detects the face and face organs (eyes, eyebrows, nose, mouth, etc.) for each frame of the moving image. Any algorithm including a known method may be used for detecting face and face organs, and thus a detailed description thereof will be omitted.

Emotion detector 104 recognizes the emotion (expression) of the worker included in the frame on the basis of the states of the detected face and face organs. In the present embodiment, emotions are classified into five types which are "neutral", "glad", "angry", "surprise", and "sad". Alternatively, emotions may be classified into seven types which are the above five types, "disgust", and "fear". A score obtained by quantifying the degree of each of the five types (or seven types) of emotions so that the total is 100 is output as the emotion recognition result. The score of each emotion is also referred to as an expression component value. The emotion (expression) also depends on the physical condition and mental state of the worker. Therefore, the score can be used to estimate the physical condition and mental state of the worker.

Note that any algorithm including known methods may be used for recognizing emotion. For example, the emotion detector 104 extracts a feature amount related to the relative position and shape of the face organs on the basis of position information of the face organs. As the feature amount, a Haar-like feature amount, a distance between feature points, a Fourier descriptor, or the like can be used. Next, emotion detector 104 inputs the extracted feature amount to a discriminator of each of the five types (or seven types) of face expressions, and calculates the degree of each expression. Each discriminator can be generated by learning using a sample image. Finally, emotion detector 104 normalizes the output values from the discriminators for the five types (or seven types) so that the total is 100, and outputs scores (expression component values) of the five types (or seven types) of emotions.

Emotion detector 104 stores the emotion recognition result together with time stamp information in a database in storage unit 101.

(Line-of-Sight Detector)

Line-of-sight detector 105 detects the line-of-sight of the worker on the basis of the moving image acquired from camera 30. Line-of-sight detector 105 detects the line-of-sight using a known technology (for example, Japanese Patent Laying-Open No. 2009-266086).

For example, line-of-sight detector 105 estimates the face direction of the worker included in each frame of the moving image. Note that the method used for estimating the face direction here is not limited to a specific method, and it is desirable to use a method capable of more accurate, high-speed, and simple estimation.

Furthermore, line-of-sight detector 105 detects the eye contour and the pupil of the worker included in each frame. For example, it is conceivable that line-of-sight detector 105 detects the inner corner of the eye and the outer corner of the eye by edge detection or corner detection. After detecting the pupil contour by edge detection, line-of-sight detector 105 detects the left end and the right end of the pupil.

Line-of-sight detector 105 calculates feature parameters on the basis of the detection results of the eye contour and the pupil. The feature parameter represents a relationship between the inner corner and the outer corner of the eye and the left end and the right end of the pupil. For example, the feature parameter indicates i) relative coordinates of the inner corner of the eye with respect to the left end of the pupil (in other words, a vector between the left end of the pupil and the inner corner of the eye) and ii) relative coordinates of the outer corner of the eye with respect to the right end of the pupil (in other words, a vector between the right end of the pupil and the outer corner of the eye). Alternatively, the feature parameter may indicate a ratio of the lengths of the two vectors described above. Both feature parameters represent the position of the pupil with respect to the eye contour.

Line-of-sight detector 105 estimates the pupil direction of the worker by applying the estimated face direction and feature parameters to the correlation between both the face direction and the feature parameters and the pupil direction. The correlation is created in advance. Line-of-sight detector 105 obtains the line-of-sight direction of the worker by adding the estimated face direction to the estimated pupil direction.

(Provision Unit)

Provision unit 106 provides a screen indicating detection results by operation section detector 103, emotion detector 104, and line-of-sight detector 105, and various types of information obtained from the detection results. Specifically, provision unit 106 displays the screen on display device 70. Various types of information may also be generated from each of the detected operation section, emotion, and line-of-sight of the worker, or may be generated by combining a plurality of items selected from the operation section, emotion, and line-of-sight.

<Verification of Estimation Example of Operation Section>

A specific verification result of the operation section estimated for the "soldering" process will be described.

Figure 5:
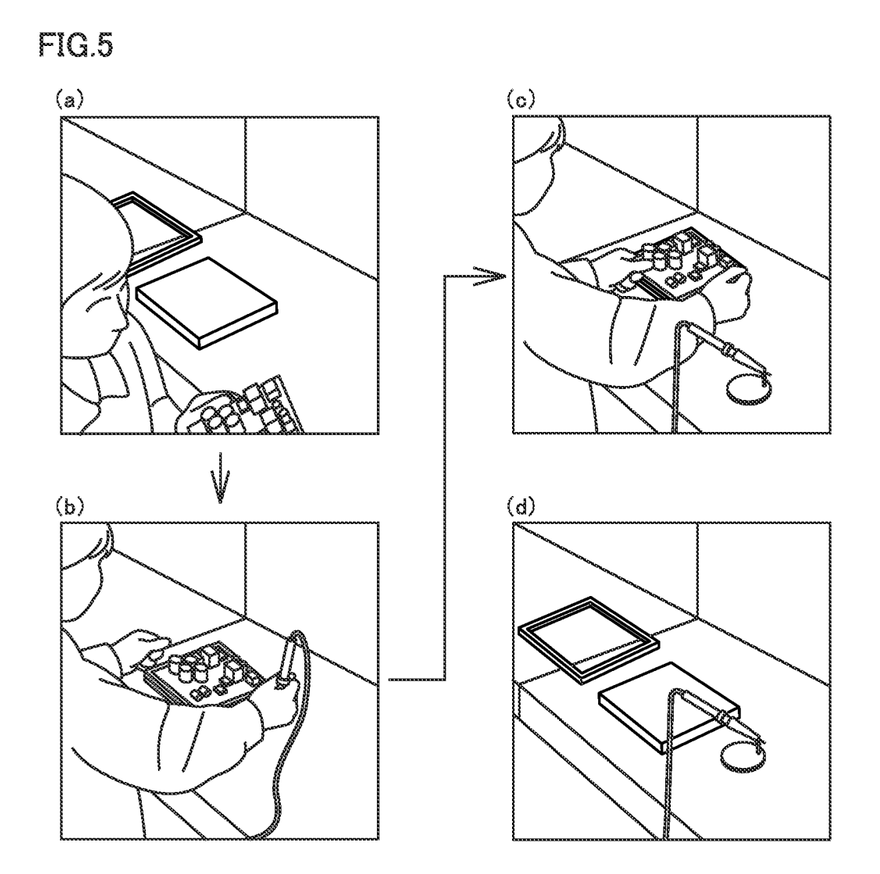

FIG. 5 is a diagram illustrating three frames respectively corresponding to three operation sections corresponding to the "soldering" process and a frame not belonging to any operation section. As described above, the "soldering" process includes a "first section" which is an operation section in which the board is carried in from a previous process and is attached to a jig, a "second section" that is an operation section in which a component is soldered to the board, and a "third section" that is an operation section in which the board is taken out from the jig and transferred to the next process. Parts (a), (b), and (c) of FIG. 5 illustrate frames belonging to the operation sections of "first section", the "second section", and the "third section", respectively. The moving image includes a frame that does not belong to any of the operation sections of the "first section", the "second section", and the "third section", that is, a frame in which no work of any of the operation sections of the "first section", the "second section", and the "third section" is performed. Therefore, inference model 133 for classifying each frame of the moving image into any one of the operation sections of the "first section", the "second section", the "third section", and "None" is generated. The operation section of "None" is a section in which no work of the operation sections of the "first section", the "second section", and the "third section" is performed.

Figure 6:
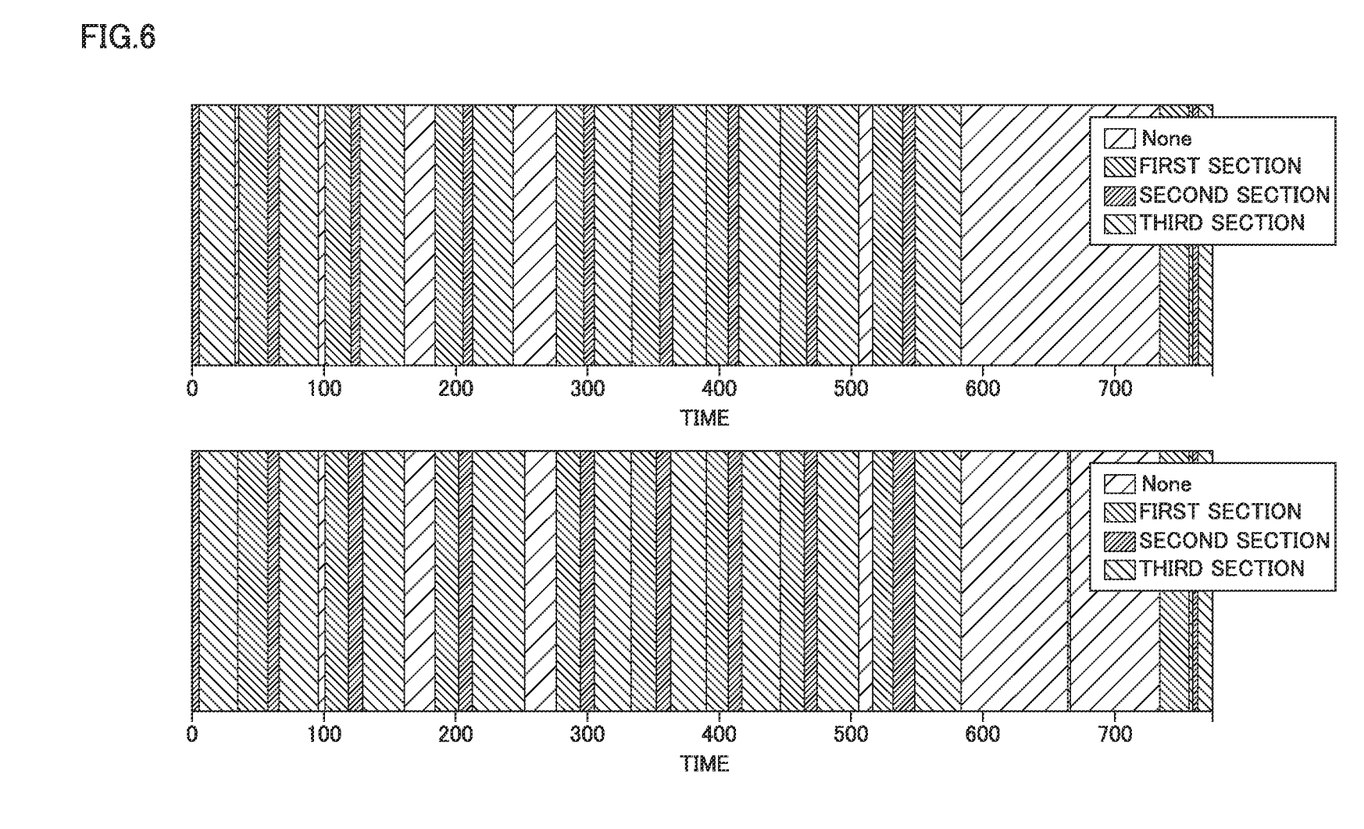
FIG. 6 is a diagram illustrating a verification result of an estimated operation section.

FIG. 6 is a diagram illustrating a verification result of an estimated operation section. The upper part of FIG. 6 illustrates operation sections classified by a person checking a moving image. That is, the upper part of FIG. 6 shows the correct answer of the operation sections. On the other hand, the lower part of FIG. 6 illustrates the operation sections inferred using inference model 133.

The operation sections illustrated in the lower part of FIG. 6 are inferred using inference model 133 generated according to the following conditions.

Used model: 3D ResNet (https://github.com/kenshohara/3D-ResNets-PyTorch)
  Input data: image of 16 frames in which each pixel indicates the density of RGB, and the image size is 112 pixels×112 pixels
  Learning Rate: 0.1 (0.01 when validation loss converges)
  Data Augmentation:
  Horizontal flip at 50%
  Randomly select from 4 corners and 1 center, and perform spatial crop
  Randomly extract 16 frames in moving image
  Transfer learning: using r3d50_K_200
  depth 50, epoch 200, classes 700, used data set kinectis-700
  Number of used data: operation section of "first section": 10, operation section of "second section": 10, operation section of "third section": 15, operation section of "None": 2
  Mini batch size: 30

As illustrated in FIG. 6, the operation sections inferred by inference model 133 are similar to the operation sections classified by human confirmation. As described above, the inference accuracy of inference model 133 is high.

<Example of Provision Screen>

Figure 7:
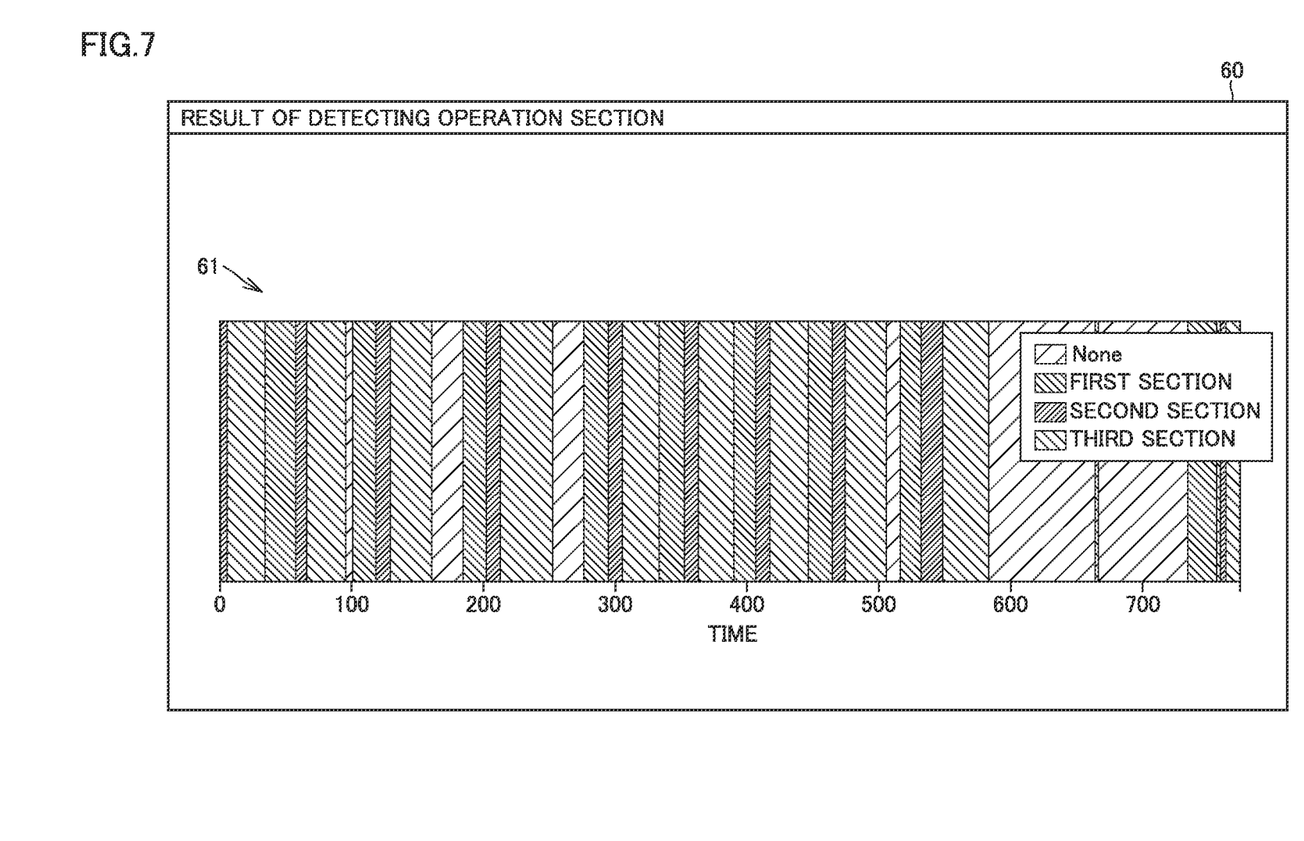
FIG. 7 is a diagram illustrating one example of a provision screen.

FIG. 7 is a diagram illustrating one example of a provision screen. A screen 60 shown in FIG. 7 includes a graph 61 provided by provision unit 106 and showing the transition of the detected operation sections. The user can determine whether the operation procedure of the worker is appropriate or not by checking screen 60.

Figure 8:
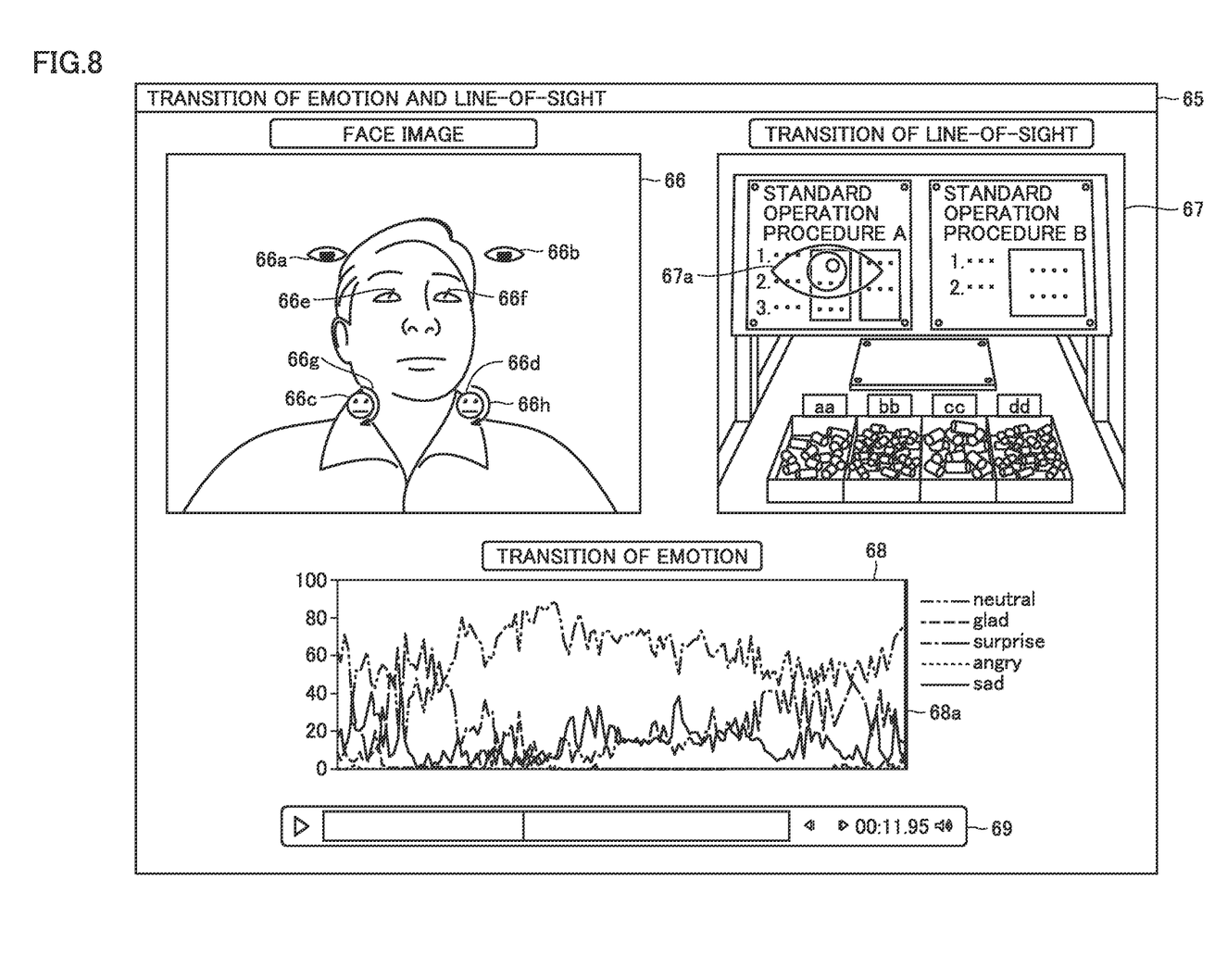
FIG. 8 is a diagram illustrating another example of the provision screen.
Figure 9:
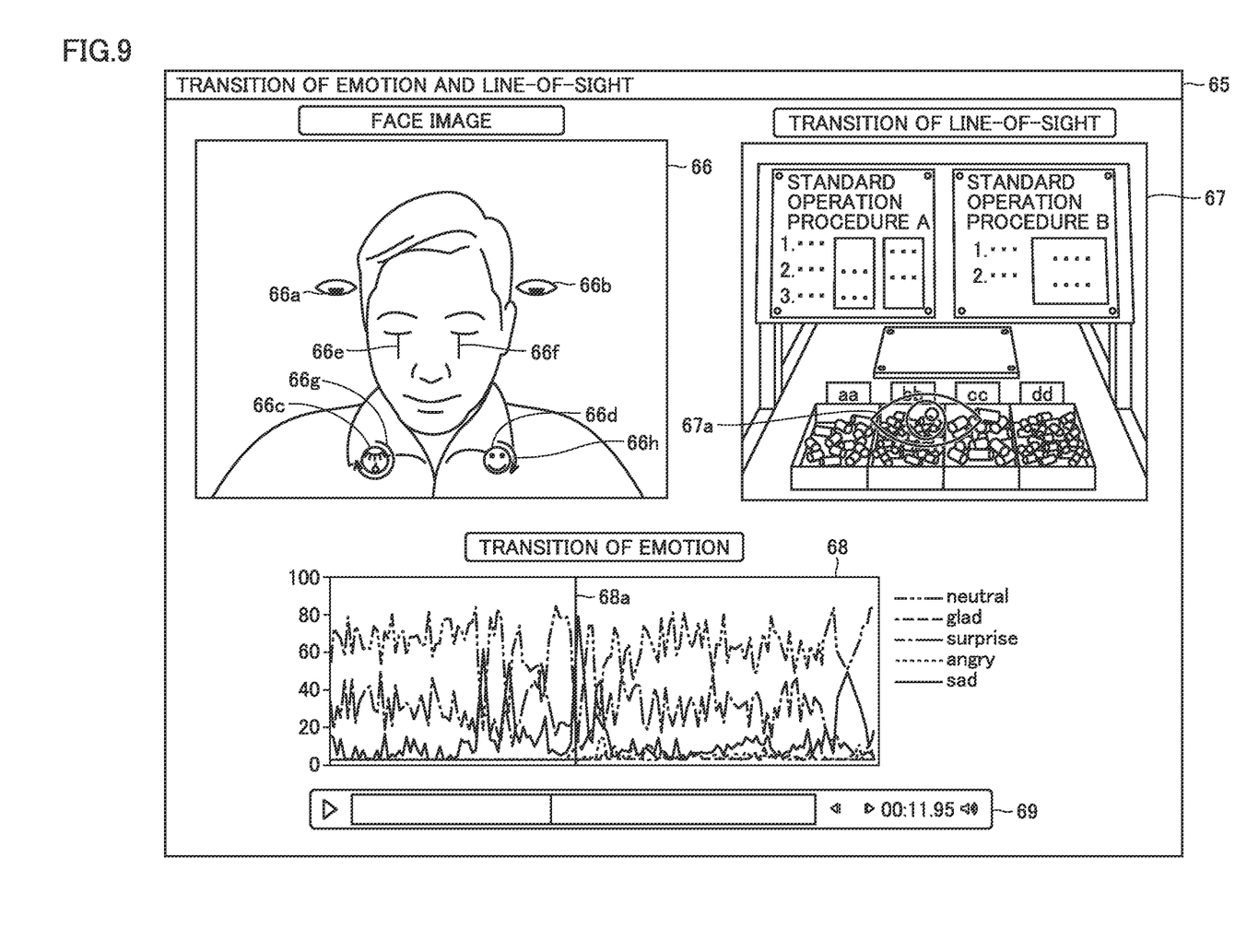
FIG. 9 is a diagram illustrating still another example of the provision screen.

FIG. 8 is a diagram illustrating another example of the provision screen. FIG. 9 is a diagram illustrating still another example of the provision screen. A screen 65 illustrated in FIGS. 8 and 9 is provided by provision unit 106. As illustrated in FIGS. 8 and 9, screen 65 includes regions 66 to 68.

In region 66, a moving image obtained by image capture with camera 30 is played. In region 66, a frame is displayed in accordance with an operation on an operation bar 69. Note that, in a case where there is no operation on operation bar 69, the latest frame acquired from camera 30 may be displayed in region 66.

In region 66, marks 66a to 66d and lines 66e and 66f are displayed in the moving image.

Mark 66a indicates the position of the pupil with respect to the contour of the right eye of the worker included in the moving image. Mark 66b indicates the position of the pupil with respect to the contour of the left eye of the worker included in the moving image. Marks 66a and 66b are generated on the basis of the eye contour and the pupil detected from the frame displayed in region 66.

Line 66e indicates the line-of-sight direction of the right eye of the worker included in the moving image. Line 66f indicates the line-of-sight direction of the left eye of the worker included in the moving image. Lines 66e and 66f are generated on the basis of the line-of-sight direction detected from the frame displayed in region 66.

As a result, the user can easily recognize the eye contour, the state of the pupils, and the line-of-sight direction of the worker by checking marks 66a and 66b and lines 66e and 66f.

Mark 66c indicates a negative type of emotion of the worker included in the moving image. Specifically, mark 66c indicates an emotion having the highest score among emotions "neutral", "surprise", "angry", and "sad", and has a picture corresponding to the emotion. Mark 66c in FIG. 8 indicates the emotion "neutral". Mark 66c in FIG. 9 indicates the emotion "sad". In addition, an indicator 66g indicating the magnitude of the score of the emotion indicated by mark 66c is illustrated around mark 66c.

Mark 66d indicates a positive type of emotion of the worker included in the moving image. Specifically, mark 66d indicates an emotion having the highest score among emotions "neutral" and "glad", and has a picture corresponding to the emotion. Mark 66d in FIG. 8 indicates the emotion "neutral". Mark 66d in FIG. 9 indicates the emotion "glad". In addition, an indicator 66h indicating the magnitude of the score of the emotion indicated by mark 66d is illustrated around mark 66d.

The user can recognize the emotion of the worker by checking marks 66c and 66d, and can recognize the degree of the emotion by checking indicators 66g and 66h.

In region 67, an image including an object in front of the worker is displayed. The image may be prepared in advance or may be acquired from a camera different from cameras 30 and 40. In region 67, a mark 67a indicating the viewpoint of the worker is also displayed. The position of mark 67a is determined on the basis of the line-of-sight direction detected from the frame displayed in region 66. In screen 65 illustrated in FIG. 8, the line-of-sight of the worker is directed to the upper left, and thus, mark 67a is displayed in the upper left portion of the image in region 67. Specifically, in the image in region 67, mark 67a is displayed so as to be superimposed on a standard operation procedure A on the upper left side. In screen 65 illustrated in FIG. 9, the line-of-sight of the worker is directed downward, and thus, mark 67a is displayed in the lower portion of the image in region 67. Specifically, in the image in region 67, mark 67a is displayed so as to be superimposed on a parts box on the lower side.

The user can easily recognize where the worker is looking by checking region 67.

In region 68, a graph indicating transition of the worker's emotion is displayed. That is, the graph indicates the transition of the score of each of the five types of emotions "neutral", "glad", "surprise", "angry", and "sad". In region 68, a line 68a indicating the time corresponding to the frame displayed in region 66 is displayed. Therefore, the user can recognize the emotion of the worker included in the frame displayed in region 66 by viewing the score of each emotion overlapping line 68a.

<Usage Example of Detection Result>

Figure 10:
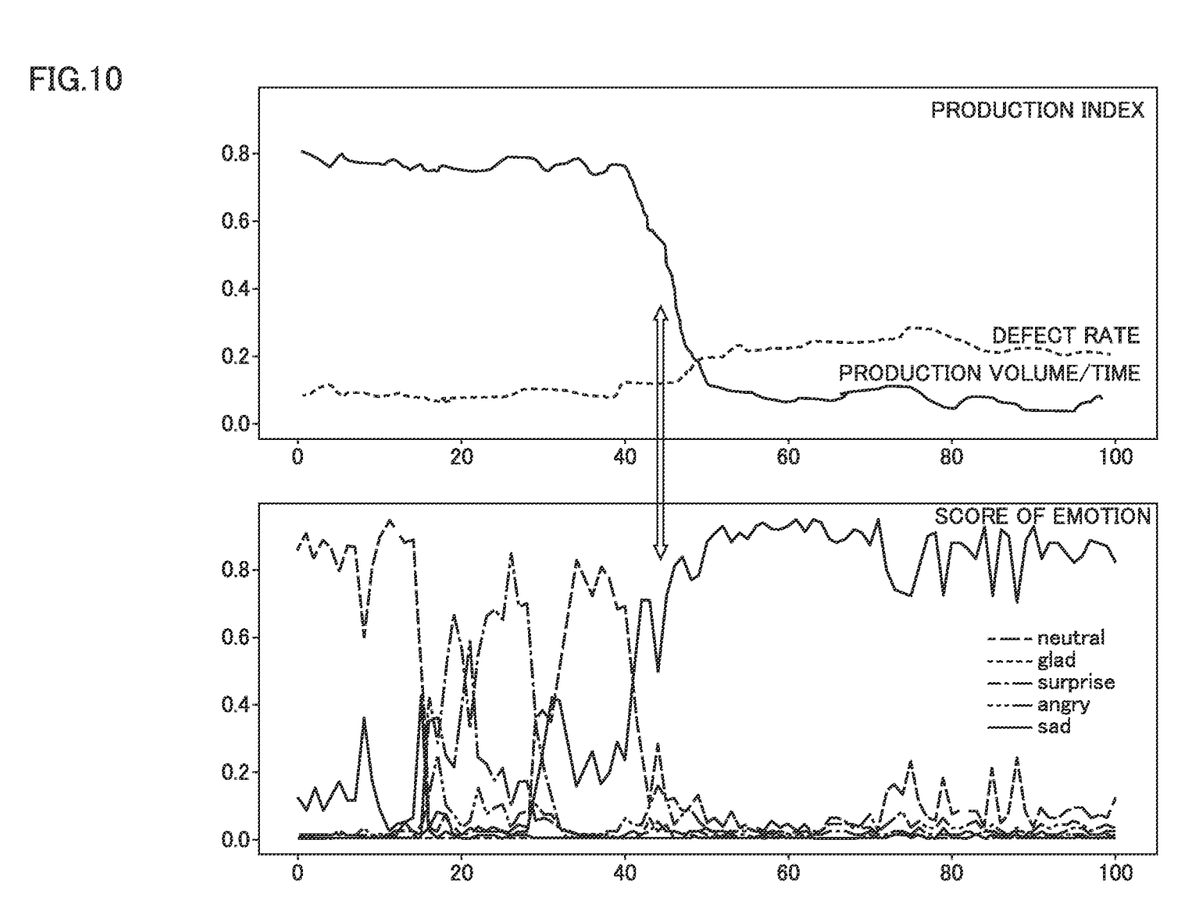
FIG. 10 is a diagram illustrating a relationship between worker's emotions and production indexes.

FIG. 10 is a diagram illustrating a relationship between worker's emotions and production indexes. The upper part of FIG. 10 illustrates the transition of the production volume and the defect rate per unit time which are production indexes. The lower part of FIG. 10 illustrates the transition of the score of each emotion of the worker. In the example illustrated in FIG. 10, a decrease in the production volume and an increase in the defect rate per unit time are observed with an increase in the score of "sad".

Therefore, an administrator can recognize the worker having the emotion leading to the decrease in production efficiency by checking region 68 in FIGS. 8 and 9, and can provide an appropriate care to the worker. Furthermore, as described above, emotion depends on physical conditions and mental states. Therefore, the administrator can recognize a change in the physical condition or mental state of the worker by checking region 68 in FIGS. 8 and 9, and give the worker a rest.

Furthermore, provision unit 106 may provide a notification for promoting care for the worker in response to the score of a target type out of the plurality of types of emotions falling outside a prescribed range on the basis of the relationship illustrated in FIG. 10. Specifically, provision unit 106 may compare the score of the emotion "sad" with a threshold, and provide a notification for promoting appropriate care in response to the score of the emotion "sad" exceeding the threshold. For example, workers with an intellectual disorder or a mental disorder often have difficulty in communication. The administrator can provide appropriate care at an early stage by receiving the above notification regarding such workers. As a result, a decrease in production efficiency can be suppressed.

The worker preferably performs the work while checking the standard operation procedure. Therefore, the administrator checks region 67 in FIGS. 8 and 9 to determine whether or not the viewpoint of the worker moves in a desired order. As a result, the administrator can determine whether or not the work is performed in an appropriate procedure.

Furthermore, provision unit 106 may store reference information indicating the transition of the viewpoint when standard work is performed, and calculate the similarity between the reference information and the transition of mark 67a displayed in region 67. The reference information is created in advance. Provision unit 106 may provide a notification indicating that the work procedure is different in response to the similarity between the reference information and the transition of mark 67a displayed in region 67 being less than the threshold. Thus, the administrator can easily recognize the worker who should be educated about the work procedure.

By checking screen 60 illustrated in FIG. 7, the administrator can create an ideal work procedure manual from the transition of operation sections detected from the moving image obtained by imaging a skilled worker. Alternatively, provision unit 106 may automatically create a work standard on the basis of the transition of detected operation sections, and provide the created work standard.

Modification

Storage 13 of information processing device 10 may not store model generation program 131. That is, information processing device 10 may not include model generator 102. In this case, information processing device 10 may acquire inference model 133 from another device in which model generation program 131 is installed. A processor of the other device executes model generation program 131 to implement model generator 102.

Storage 13 of information processing device 10 may not store one or two of operation section detection program 134, emotion detection program 135, and line-of-sight detection program 136. That is, information processing device 10 may not include one or two functional blocks of operation section detector 103, emotion detector 104, and line-of-sight detector 105. For example, in a case where information processing device 10 includes only emotion detector 104, it is only sufficient that provision unit 106 provides screen 65 including regions 66 and 68 but not including region 67. In a case where information processing device 10 includes only line-of-sight detector 105, it is only sufficient that provision unit 106 provides screen 65 including regions 66 and 67 but not including region 68. In a case where information processing device 10 includes only operation section detector 103, provision unit 106 provides screen 60 illustrated in FIG. 7 and does not provide screen 65 illustrated in FIGS. 8 and 9. In a case where information processing device 10 includes only emotion detector 104 and line-of-sight detector 105, provision unit 106 provides screen 65 illustrated in FIGS. 8 and 9 and does not provide screen 60 illustrated in FIG. 7. In a case where information processing device 10 includes only operation section detector 103 and emotion detector 104, it is only sufficient that provision unit 106 provides screen 60 illustrated in FIG. 7 and screen 65 including regions 66 and 68 but not including region 67. In a case where information processing device 10 includes only operation section detector 103 and line-of-sight detector 105, it is only sufficient that provision unit 106 provides screen 60 illustrated in FIG. 7 and screen 65 including regions 66 and 67 but not including region 68.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information processing device comprising:
   a processor; and
   a memory storing computer-executable instructions that, when executed by the processor, cause the processor to perform operations, the operations including:
   acquiring a first video from a first camera that images a target worker and surroundings of the target worker, the first camera being installed at a production site in which work including multiple operation sections is performed, the first video including a plurality of frames;
   detecting, from the multiple operation sections, an operation section to which each frame of the plurality of frames belongs using an inference model; and
   providing a detection result by detecting the operation section, wherein:
the inference model is generated by learning processing using a plurality of learning data sets, each of the plurality of learning data sets including a predetermined number of consecutive second frames included in a video that includes a specific worker, and a label indicating an operation section of work performed by the specific worker included in the predetermined number of consecutive second frames, and
detecting the operation section includes:
inputting a predetermined number of consecutive first frames including a target frame of the plurality of frames to the inference model; and
detecting, as the operation section to which the target frame belongs, an operation section indicated by the label that is output from the inference model.

2. The information processing device according to claim 1, wherein the operations further include:
acquiring a second video from a second camera that images a face of the target worker, the second camera being installed at the production site;
detecting an emotion of the target worker included in each frame of the second video; and
providing a transition of the emotion.

3. The information processing device according to claim 1, wherein the operations further include:
acquiring a second video from a second camera that images a face of the target worker, the second camera being installed at the production site;
detecting a line-of-sight direction of the target worker included in each frame of the second video;
providing an image including an object in front of the target worker;
determining a position of a viewpoint of the target worker in the image based on the line-of-sight direction; and
displaying a mark at the determined position in the image.

4. The information processing device according to claim 1, the operations further include:
acquiring a second video from a second camera that images a face of the target worker, the second camera being installed at the production site;
detecting an emotion of the target worker included in each frame of the second video;
detecting a line-of-sight direction of the target worker included in each frame of the second video;
providing a transition of the emotion;
providing an image including an object in front of the target worker;
determining a position of a viewpoint of the target worker in the image based on the line-of-sight direction; and
displaying a mark at the determined position in the image.

5. The information processing device according to claim 2, wherein the operations further include:
outputting a score of each of a plurality of types of the emotion, and
providing a notification for promoting care for the target worker in response to a score of a target type out of the plurality of types falling outside a prescribed range.

6. The information processing device according to claim 1, wherein the detection result includes a graph showing a transition of detected operation sections.

7. An information processing method comprising:
acquiring a first video from a first camera that images a target worker and surroundings of the target worker, the first camera being installed at a production site in which work including multiple operation sections is performed, the first video including a plurality of frames;
detecting, from the multiple operation sections, an operation section to which each frame of the plurality of frames belongs using an inference model; and
providing a detection result by detecting the operation section,
wherein:
the inference model is generated by learning processing using a plurality of learning data sets, each of the plurality of learning data sets including a predetermined number of consecutive second frames included in a video that includes a specific worker, and a label indicating an operation section of work performed by the specific worker included in the predetermined number of consecutive second frames, and
detecting the operation section includes:
inputting a predetermined number of consecutive first frames including a target frame of the plurality of frames to the inference model; and
detecting, as the operation section to which the target frame belongs, an operation section indicated by the label that is output from the inference model.

8. The information processing method according to claim 7, further comprising:
acquiring a second video from a second camera that images a face of the target worker, the second camera being installed at the production site;
detecting an emotion of the target worker included in each frame of the second video; and
providing a transition of the emotion.

9. The information processing method according to claim 7, further comprising:
acquiring a second video from a second camera that images a face of the target worker, the second camera being installed at the production site;
detecting a line-of-sight direction of the target worker included in each frame of the second video;
providing an image including an object in front of the target worker;
determining a position of a viewpoint of the target worker in the image based on the line-of-sight direction; and
displaying a mark at the determined position in the image.

10. The information processing method according to claim 7, further comprising:
acquiring a second video from a second camera that images a face of the target worker, the second camera being installed at the production site;
detecting an emotion of the target worker included in each frame of the second video;
detecting a line-of-sight direction of the target worker included in each frame of the second video;
providing a transition of the emotion;
providing an image including an object in front of the target worker;
determining a position of a viewpoint of the target worker in the image based on the line-of-sight direction; and
displaying a mark at the determined position in the image.

11. The information processing method according to claim 8, further comprising:
outputting a score of each of a plurality of types of the emotion, and providing a notification for promoting care for the target worker in response to a score of a target type out of the plurality of types falling outside a prescribed range.

12. The information processing method according to claim 7, wherein the detection result includes a graph showing a transition of detected operation sections.

\* \* \* \* \*